Feb. 26, 1952 K. B. KAISER 2,586,955
FINISHING CUTTER
Original Filed Oct. 5, 1945 2 SHEETS—SHEET 1

INVENTOR
Karl B Kaiser
By Carlson, Pitzner Hubbard & Wulf
ATTORNEYS

Feb. 26, 1952 K. B. KAISER 2,586,955
FINISHING CUTTER
Original Filed Oct. 5, 1945 2 SHEETS—SHEET 2
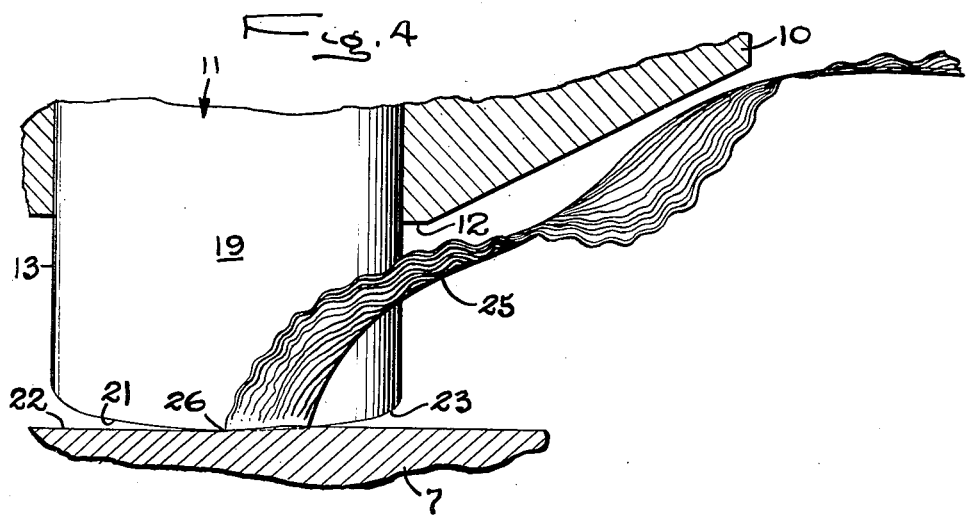
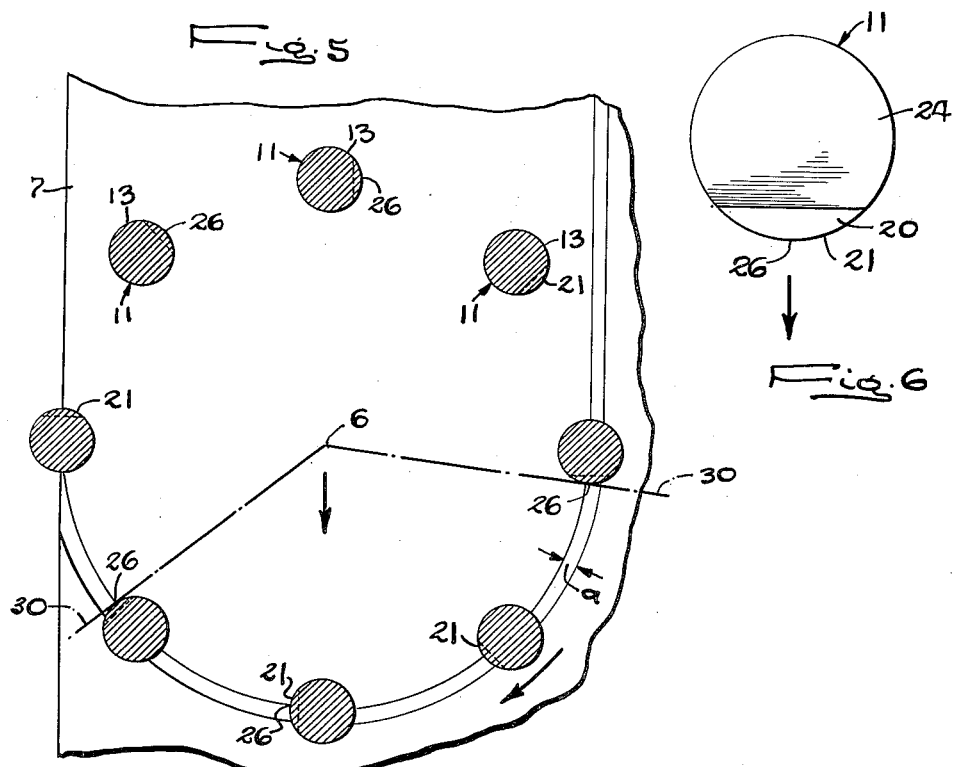
INVENTOR
Karl B Kaiser
By Carlson, Pitzner, Hubbard & Wolfe
ATTORNEY Patented Feb. 26, 1952

2,586,955

UNITED STATES PATENT OFFICE 2,586,955

FINISHING CUTTER

Karl B. Kaiser, Rockford, Ill., assignor to The Ingersoll Milling Machine Company, Rockford, Ill., a corporation of Illinois Continuation of application Serial No. 620,479, October 5, 1945. This application April 12, 1950, Serial No. 155,410

1 Claim. (Cl. 29—105)

The general object is to provide a plural tooth face milling cutter which enables a work surface to be finished milled to greater flatness than has been possible with prior face milling cutters, which presents to the work a continuous cutting edge free from interruptions or corners, which is simple in construction and convenient to sharpen with the active portions of cutting edges located precisely in a common plane.

A more detailed object is to provide a face milling cutter of the above character, the teeth of which have cutting faces convexly curved about the longitudinal axes of the teeth and intersecting flat primary clearance faces at cutting edges whose projection on radial planes of the cutter through the tips of the respective teeth constitute the flattest portions of shallow ellipses.

Other objects and advantages of the invention will become apparent from the following detailed description taken in connection with the accompanying drawings, in which Figure 1 is a perspective view of a face milling cutter embodying the present invention.

Fig. 4 is an enlarged view of a portion of Fig. 2.

Fig. 5 shows the arrangement of the cutter teeth relative to a workpiece during a face milling operation.

Fig. 6 is an end view of one of the cutter teeth.

Figure 1:
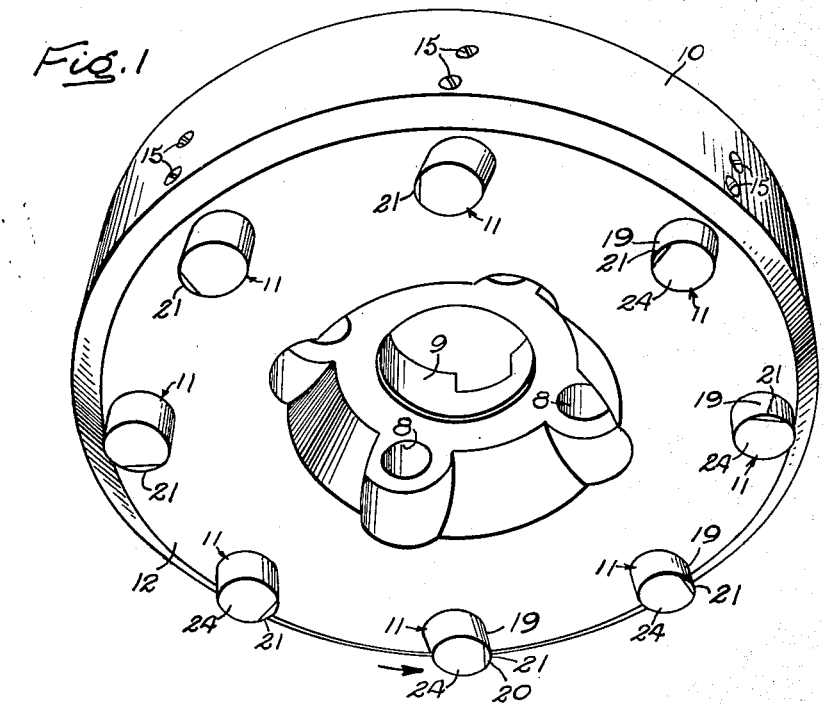
Figure 2:
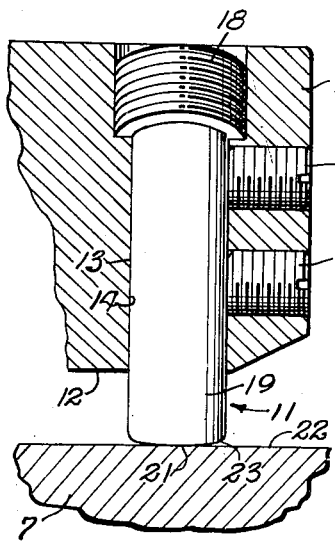
Figs. 2 and 3 are fragmentary cross-sectional views taken respectively along circumferentially and radially extending lines through the cutter body.
Figure 3:
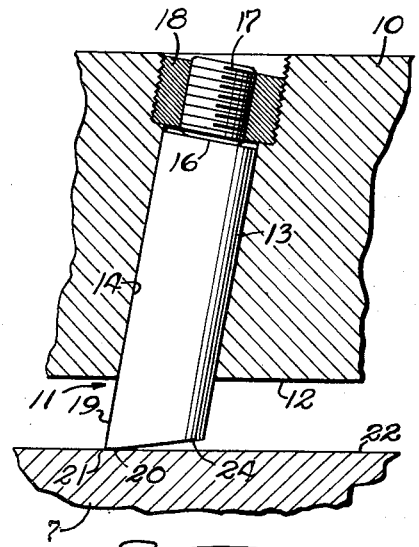

In the drawings, the invention is shown for purposes of illustration embodied in a finishing cutter of the face milling type comprising a body 10 centrally apertured at 9 and having holes 8 for receiving screws for attaching the body rigidly to the rotary spindle of a milling machine. A plurality of teeth 11 projecting from one end surface 12 of the body are arranged therearound in an annular series for taking successive arcuate cuts across the workpiece 7 as the cutter while rotating about its axis 6 in the direction shown by the curved arrow in Fig. 5 is fed transaxially along the work in the direction of the other arrow.

As shown, each tooth comprises the end portion of a solid cylinder 13 received in a bore 14 in the body and clamped therein by screws 15. The inner end of each cylindrical blade may be backed by a suitable abutment 16 which may comprise the end of a set screw 17 carried by a plug 18 which is threaded into the enlarged end of the bore opposite the tooth proper.

The bores 14 are inclined in the cutter body at the angle desired to impart the desired rake to the cutting face 19 on the forward or leading side of the tooth. This face is of convex contour and is arcuately curved about an axis of curvature which extends longitudinally of the tooth and in this instance is the axis of the cylinder 13. A curved cutting edge 21 is formed by the intersection of the cutting face on the side of the tooth with a clearance face 20 on the end of the tooth. This primary clearance face is flat and disposed at a very small angle, for example, two degrees, relative to the plane of the finished work surface 22. While the clearance face 20 may extend across the entire end of the tooth, it is made relatively narrow in the present instance and the remainder 24 of the tooth end is disposed at a greater angle, for example, seven degrees, so as to constitute a secondary clearance face. By regulating the magnitudes of the angles of the primary and secondary clearance faces 20 and 24, both quality of finish and depth of stock may be varied to suit the requirements of any particular job.

By utilizing the convexly contoured side of the tooth as the cutting face thereof and by making this contour truly arcuate, the intersection of the cutting face 19 with the primary clearance face 20 is a curved line 21 whose projection onto a radial plane 30 (Fig. 5) extending through the leading tip or most advanced point 26 on the cutting edge is the flattened side of an extremely shallow ellipse. Thus, the leading or active portion of the cutting edge 21 including the tip 26 is substantially flat and then gradually curves away at 23 from the finished work surface 22 thereby avoiding any interruptions or the formation of any sharp corners or projections along the active part of the cutting edge. Because of this, the chip 25 removed by each tooth decreases progressively in thickness, and the flattened portion of the elliptical cutting edge merges so gradually into the plane of the finished surface 22 that the latter possesses extreme smoothness. In adidition, the work surface is of uniform smoothness and extreme accuracy owing to the precision that may be obtained in sharpening the cutting edges of the different teeth to identical contours with the tips 26 disposed precisely in a single plane and equidistant from the body axis 6. This involves simply the grinding of the flat primary clearance faces 20 at the same angles on the different teeth, an operation which may easily be performed on modern cutter sharpening machines.

With tooth cutting faces which are convexly and arcuately curved around the axes of the teeth, it will be apparent that the shear angle at which the cutting edge acts will vary progressively across the tooth face, increasing from a minimum at the initial point 26 of contact of the cutting edge with the finished work surface 22 which point is at the center of the primary clearance face 20. For this same reason, the shear angle may be varied as desired and the tip or initial point 26 of work contact may be shifted around the tooth simply by tilting the plane of the clearance face 20 relative to the tooth axis. The initial point 26 of work contact would be substantially at the center of the teeth with the latter disposed as shown in Figs. 1 and 5 and each cutting edge would intersect the work over an area $a$ (Fig. 5).

The use of a convexly curved cutting face also results in more effective disposal of the chips. Since these flow along and off from a curved surface, they are warped and thus reinforced against curling so as to naturally flow outwardly and out of interfering relation with respect to the succeeding teeth.

Also, since the cutting edges 21 are rounded, it is unnecessary to grind the cutter so as to match the cutting edge contour with the tilt of the machine tool spindle on which the cutter is to be used as is necessary with conventional finishing cutters. The present cutter is thus adapted for use interchangeably in machines having different spindle tilts, and this without regrinding of the cutter.

Owing to the variation in the effective shear angle across the cutting faces of the teeth, the improved cutter is much less susceptible to chattering than the cutters heretofore used.

In the use of the face milling cutter above described, the cutter body 10 is attached to the rotary spindle of a milling machine, and the workpiece is mounted for relative feeding of the work and rotating cutter transaxially of the latter along the plane of the work surface to be finished. With the cutter rotating in the direction shown by the arrow in Fig. 1, and positioned for entry of the teeth to the proper depth in the work, the successive teeth will traverse arcuate paths across the work, the leading sides of the teeth presenting convex and arcuately curved cutting faces as described above. In passing through the work, each individual edge would, in the absence of forward feeding of the work, remove metal and form an extremely shallow groove of a cross section identical with the shallow portion of the projected ellipse of intersection above referred to. By simultaneously feeding the work in the direction indicated by the arrow in Fig. 5 as in any face milling operation, the grooves cut by the successive teeth overlap each other within the range of substantial flatness of the cutting edges. That is to say, the cutting edges 21 merge so gradually with the finished work surface 22 as to leave the latter extremely flat and smooth.

This application is a continuation of my copending application Serial No. 620,479, filed October 5, 1945, and now abandoned.

I claim as my invention:

A milling cutter comprising a body adapted to be mounted on a spindle for rotation about a central axis, a plurality of teeth projecting from one end of said body along said axis and spaced angularly around and equidistant from the axis, each of said teeth, when said body is rotated in the cutting direction about said axis, having a leading cutting face convexly curved about the longitudinal axis of the tooth, and a flat primary clearance face on the end of each tooth lying in a single plane and intersecting said convex cutting face at a continuous gradually curved cutting edge the projection of which on a radial plane of said body through the leading tip of the tooth is the flattest side of a shallow ellipse, the leading tips of all of said teeth being spaced equidistant from said body axis.

KARL B. KAISER.

REFERENCES CITED

The following references are of record in the file of this patent:

UNITED STATES PATENTS

| Number | Name | Date |
|---|---|---|
| 77,522 | Potter | May 5, 1868 |
| 1,223,654 | Allingham | Apr. 24, 1917 |
| 2,348,089 | Neikirk | May 2, 1944 |
| 2,382,509 | Seiter | Aug. 14, 1945 |
| 2,413,452 | Kaiser | Dec. 31, 1946 |